United States Patent
Chiang et al.

(10) Patent No.: US 10,430,663 B2
(45) Date of Patent: Oct. 1, 2019

(54) METHOD, ELECTRONIC DEVICE AND NON-TRANSITORY COMPUTER READABLE STORAGE MEDIUM FOR IMAGE ANNOTATION

(71) Applicant: INSTITUTE FOR INFORMATION INDUSTRY, Taipei (TW)

(72) Inventors: Hsin-Han Chiang, Taipei (TW); Yen-Lin Chen, Taipei (TW); Chien Lin, New Taipei (TW); Chao-Wei Yu, Jiadong Township, Pingtung County (TW); Meng-Tsan Li, Taichung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 112 days.

(21) Appl. No.: 15/834,510

(22) Filed: Dec. 7, 2017

(65) Prior Publication Data
US 2019/0156123 A1 May 23, 2019

(30) Foreign Application Priority Data
Nov. 23, 2017 (TW) .............................. 106140836 A

(51) Int. Cl.
*G06K 9/00* (2006.01)
*H04N 7/18* (2006.01)
(Continued)

(52) U.S. Cl.
CPC ..... *G06K 9/00744* (2013.01); *G06K 9/00718* (2013.01); *G06K 9/00758* (2013.01);
(Continued)

(58) Field of Classification Search
USPC ....... 382/100, 103, 106–107, 154, 162, 168, 382/173, 181, 190–194, 209, 224, 232,
(Continued)

(56) References Cited

U.S. PATENT DOCUMENTS

2012/0095982 A1* 4/2012 Lennington ........ G06K 9/00624
707/706
2014/0347475 A1* 11/2014 Divakaran ......... G06K 9/00771
348/135
(Continued)

OTHER PUBLICATIONS

Song et al., "Recognizing key segments of videos for video annotation by learning from web image sets", Multimed Tools Appl, 2017, vol. 76, pp. 6111-6126.

*Primary Examiner* — Seyed H Azarian
(74) *Attorney, Agent, or Firm* — Birch, Stewart, Kolasch & Birch, LLP

(57) ABSTRACT

An image annotation method includes the following. Image frames are acquired. One or more target objects are identified and tracked from the image frames. Candidate key image frames are selected from the frames according to a first selection condition. First similarity indexes of the candidate key image frames are determined. Second similarity indexes of a plurality of adjacent frames are determined. The candidate key image frames as well as the adjacent frames that meet a second selection condition are selected as key image frames. The key image frames are displayed on a graphical user interface. Annotation information about the one or more target objects is display through the graphical user interface.

20 Claims, 9 Drawing Sheets

(51) Int. Cl.
*G06T 7/246* (2017.01)
*G06K 9/62* (2006.01)
*G06T 7/262* (2017.01)
*G06T 7/269* (2017.01)

(52) U.S. Cl.
CPC ......... *G06K 9/6259* (2013.01); *G06K 9/6269* (2013.01); *G06T 7/248* (2017.01); *G06K 2209/21* (2013.01); *G06T 7/262* (2017.01); *G06T 7/269* (2017.01); *G06T 2200/24* (2013.01); *G06T 2207/10016* (2013.01)

(58) Field of Classification Search
USPC ....... 382/254, 274, 276, 285–291, 305, 312; 348/135; 386/241; 707/706
See application file for complete search history.

(56) References Cited

U.S. PATENT DOCUMENTS

| | | | |
|---|---|---|---|
| 2016/0014482 A1* | 1/2016 | Chen | G11B 27/031 386/241 |
| 2016/0275642 A1* | 9/2016 | Abeykoon | G06T 1/20 |
| 2017/0177943 A1* | 6/2017 | Mehrseresht | G06T 7/248 |
| 2018/0137892 A1* | 5/2018 | Ding | G06K 9/00744 |

* cited by examiner

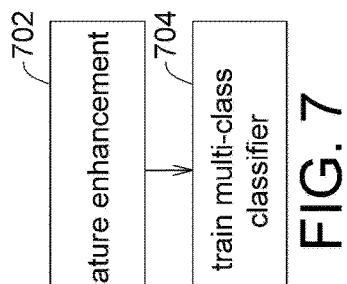
FIG. 7
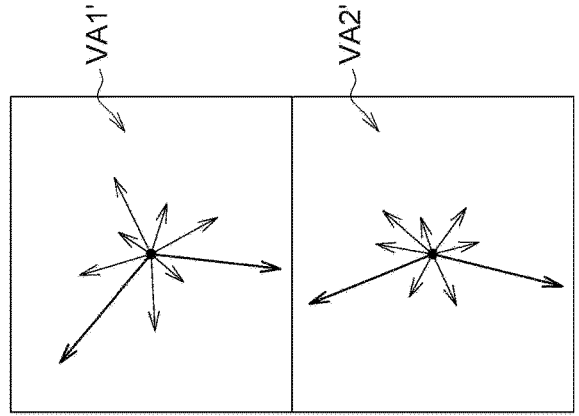
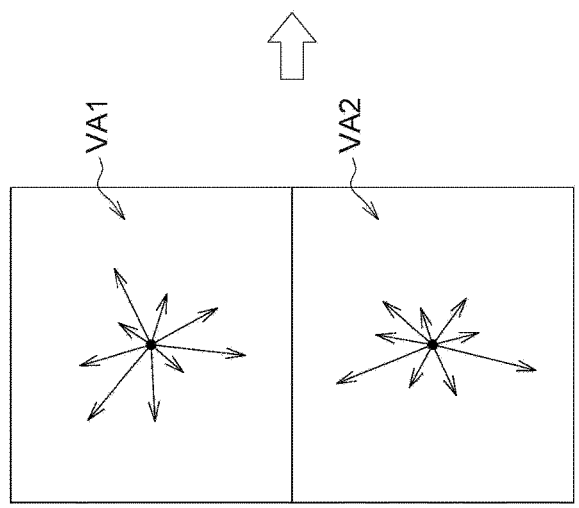
FIG. 8
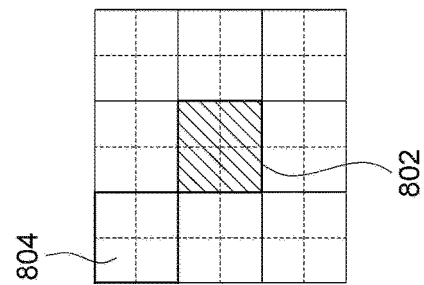

1202:

1204:

1206:

METHOD, ELECTRONIC DEVICE AND NON-TRANSITORY COMPUTER READABLE STORAGE MEDIUM FOR IMAGE ANNOTATION

This application claims the benefit of Taiwan application Serial No. 106140836, filed Nov. 23, 2017, the subject matter of which is incorporated herein by reference.

TECHNICAL FIELD

The present invention relates to an image processing method, an electronic device, and a non-transitory computer-readable storage medium, and more particularly to an image annotation method, an electronic device and a non-transitory computer-readable storage medium.

BACKGROUND

The current deep learning technology combined with computer vision has been the development trend of artificial intelligence (AI). However, the deep learning network needs a large number of image annotation training samples to improve the accuracy.

At present, most of the image annotation methods are done manually. The operator needs to select the objects one by one for each image frame in the video data and key in the associated annotation. However, when there are a large number of target objects in the video data, such manual annotation method is time-consuming and labor-intensive.

SUMMARY

The present invention relates to an image annotation method, an electronic device and a non-transitory computer-readable storage medium, which can automatically filter out highly repetitive invalid image frame samples in the video data, extract key image frames with object structure diversity, and provide the key image frames to the user for browsing, so that the annotation items can be added and/or modified by the user, thereby improving the annotation result and saving labor required for image annotation. On the other hand, the technique proposed in the present invention also involves expert experience feedback mechanism to enhance the accuracy and robustness for extracting the key image frames.

According to an aspect of the present invention, an image annotation method implemented by an electronic device including a processor is provided. The image annotation method including the following. A sequence of image frames including a plurality of image frames is acquired from video data by the processor. An object detecting and tracking procedure is performed on the sequence of image frames by the processor, so as to identify and track one or more target objects from the image frames. A plurality of candidate key image frames are selected from the image frames according to a first selection condition by the processor, wherein the first selection condition comprises when a target object in the one or more target objects starts to appear or disappears in an image frame of the image frames, selecting the image frame as one of the candidate key image frames. A plurality of first similarity indexes of the candidate key image frames are determined by the processor, wherein each of the first similarity indexes is determined by the processor through a similarity calculation according to a first covariance value of a corresponding one of the candidate key image frames and a plurality of first variation values statistically calculated in different directions of the corresponding candidate key image frame. A plurality of second similarity indexes of a plurality of adjacent image frames are determined by the processor, wherein each of the adjacent image frames is adjacent to at least one of the candidate key image frames, and each of the second similarity indexes is determined by the processor through the similarity calculation according to a second covariance value of a corresponding one of the adjacent image frames and a plurality of second variation values statistically calculated in different directions of the corresponding adjacent image frame. The candidate key image frames as well as the adjacent image frames that meet a second selection condition are selected as a plurality of key image frames, wherein the second selection condition comprises when a difference between a corresponding second similarity index of an adjacent image frame of the adjacent image frames and a corresponding first similarity index of a candidate key image frame adjacent to the adjacent image frame exceeds a similarity threshold, selecting the adjacent image frame as one of the key image frames. The key image frames are presented on a graphical user interface and annotation information for the one or more target objects are displayed through the graphical user interface by the processor.

According to another aspect of the present invention, a non-transitory computer-readable storage medium is provided. The non-transitory computer-readable storage medium stores one or more instructions executable by a processor to cause an electronic device including the processor perform the image annotation method of the present invention.

According to yet aspect of the present invention, an electronic device is provided. The electronic device includes a memory and a processor. The processor is coupled to the memory and is configured to: acquire a sequence of image frames comprising a plurality of image frames from video data; perform an object detecting and tracking procedure on the sequence of image frames, so as to identify and track one or more target objects from the image frames; select a plurality of candidate key image frames from the image frames according to a first selection condition, wherein the first selection condition comprises when a target object in the one or more target objects starts to appear or disappears in an image frame of the image frames, selecting the image frame as one of the candidate key image frames; determine a plurality of first similarity indexes of the candidate key image frames, wherein each of the first similarity indexes is determined by the processor through a similarity calculation according to a first covariance value of a corresponding one of the candidate key image frames and a plurality of first variation values statistically calculated in different directions of the corresponding candidate key image frame; determine a plurality of second similarity indexes of a plurality of adjacent image frames, wherein each of the adjacent image frames is adjacent to at least one of the candidate key image frames, and each of the second similarity indexes is determined by the processor through the similarity calculation according to a second covariance value of a corresponding one of the adjacent image frames and a plurality of second variation values statistically calculated in different directions of the corresponding adjacent image frame; select the candidate key image frames as well as the adjacent image frames that meet a second selection condition as a plurality of key image frames, wherein the second selection condition comprises when a difference between a corresponding second similarity index of an adjacent image frame of the adjacent image frames and a corresponding first similarity index of a candidate key image frame adjacent to the adjacent image frame exceeds a similarity threshold, selecting the adjacent image frame as one of the key image frames; present the key image frames on a graphical user interface and display annotation information for the one or more target objects through the graphical user interface.

For a better understanding of the above and other aspects of the present invention, embodiments are described below in detail with reference to the accompanying drawings:

BRIEF DESCRIPTION OF THE DRAWINGS

FIG. 7 is a non-limiting detailed flowchart of step 114 in FIG. 1.

FIG. 8 is a schematic diagram of enhanced HOG features.

Figure 1:
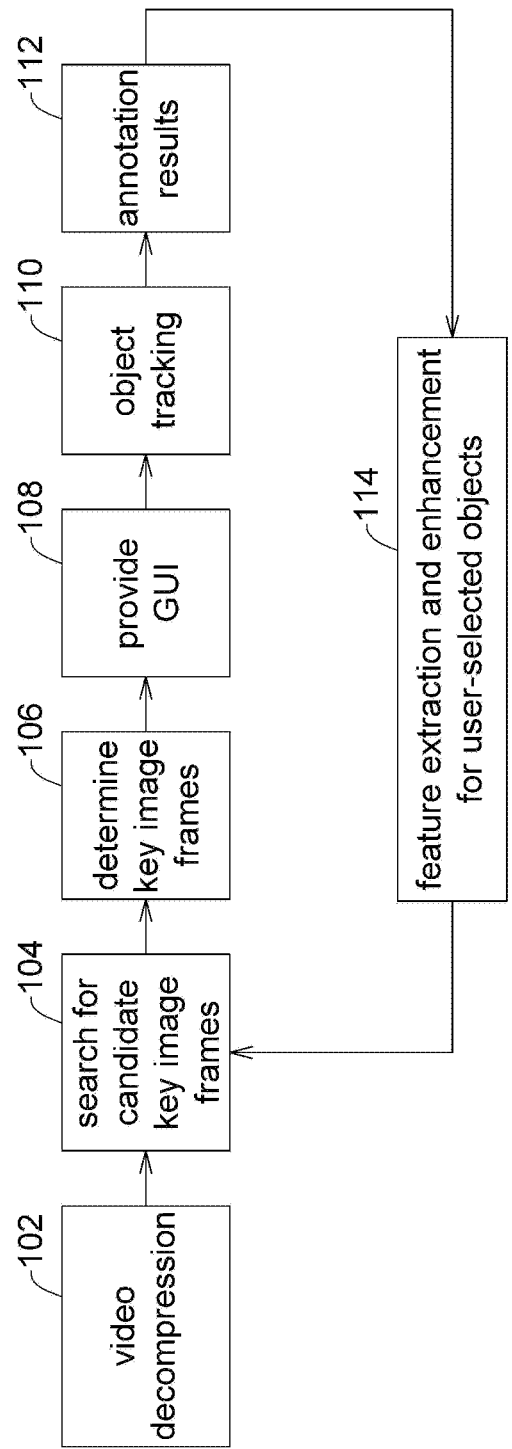
FIG. 1 is a flow chart of an image annotation method according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The present invention provides an image annotation method, an electronic device, and a non-transitory computer-readable storage medium. Image annotation may refer to, for example, recognizing one or more specific objects in the video data through computer vision technology and assigning corresponding names or semantic descriptions to the identified specific objects. Taking unmanned autonomous vehicles for example, video sensors on vehicles may obtain a video stream of driving images. Through the image annotation technology, the automatic driving system may identify objects around the vehicle such as pedestrians, vehicles, cats, dogs, etc., and make a reaction in response to the identified environmental objects and the corresponding annotations, such as dodging the pedestrians that suddenly appear in front.

The image annotation method of the present invention may be implemented by an electronic device. For example, the electronic device includes a memory and a processor. The memory may store programs, instructions, data or files that the processor may obtain or execute. The processor is coupled to the memory and is configured to execute the image annotation method according to the embodiments of the present invention. The processor may, for example, be implemented as a microcontroller, a microprocessor, a digital signal processor, an application specific integrated circuit (ASIC), a digital logic circuit, a field programmable gate array (FPGA), or any other hardware element having processing functions. The image annotation method of the present invention may also be implemented as a software program, which can be stored on a non-transitory computer-readable storage medium such as a hard disk, a compact disc, a flash drive, a memory. When the processor loads the software program from the non-transitory computer readable storage medium, the image annotation method of the present invention may be executed.

FIG. 1 is a flow chart of an image annotation method according to an embodiment of the present invention. The image annotation method may be implemented by an electronic device including a processor.

In step 102, the processor performs video decompression to obtain an image frame sequence from the video data. The image frame sequence includes a plurality of image frames.

In step 104, the processor searches for candidate key image frames from the acquired image frames. In an embodiment, the processor may execute an object detecting and tracking procedure on the image frame sequence to identify and track one or more target objects from the image frames, and if it is determined that a change of the structural feature of a target object in an image frame exceeds a preset threshold, the image frame is selected as a candidate key image frame.

In step 106, the processor determines key image frames from the image frames. In addition to including the candidate key image frames selected in step 104, the key image frames may also include the image frames adjacent to the candidate key image frames that meet particular conditions. Here, two image frames being "adjacent" to each other refers to that the two image frames are adjacent to each other in a time sequence of a consecutive image frame sequence (e.g., a video stream). For example, two image frames adjacent to each other may be obtained at two continuous sampling time points.

In step 108, the processor presents the key image frames on a graphical user interface (GUI) and displays annotation information about the target objects through the GUI. The annotation information may include, for example, the name or the semantic description of the target objects, such as "pedestrian", "moving car" and the like.

The GUI may also allow the user to select a new unidentified object from the key image frames and annotate it. For example, some objects may not be identified or tracked in an image frame containing a complex background. In this case, the user may manually select the unidentified object from the key image frames and annotate it. The object image selected by the user is called "a user-selected object".

The term "user" as used herein includes, for example, a person or entity that owns an electronic device that is capable of performing the image annotation method of the present invention; a person or entity that operates or utilizes the electronic device; or a person or entity that is otherwise associated with the electronic device. It is contemplated that the term "user" is not intended to be limiting and may include various examples beyond those described.

In step 110, the processor performs object tracking on the user-selected object. This step can be done with any known object tracking algorithm.

In step 112, the processor obtains an annotation result. For example, the processor may receive a user operation via the GUI provided in step 108 and generate the annotation result in response to the user operation. The annotation result may include, for example, the user-selected objects and the annotation information about the user-selected objects. The user-selected objects may be extracted from the image contents of the key image frames. For example, the user may select a person's image in a key image frame as a user-selected object and key-in the corresponding annotation information as "pedestrian" through the GUI.

In an embodiment, the image annotation method may further include step 114. In step 114, the features of the user-selected object are extracted and enhanced. The results of feature extraction and enhancement may be provided as training samples to train and update the classifiers in step 104 for executing object detection, so that the performance of image annotation can be enhanced through the feedback of expert experience.

Figure 2:
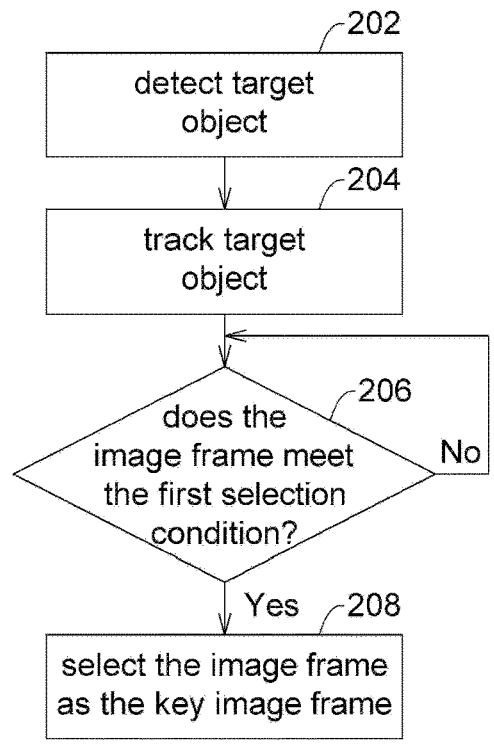
FIG. 2 is a flow chart of an example of searching for candidate key image frames.

FIG. 2 is a flow chart of an example of searching for candidate key image frames. In a non-limiting example, the flow of FIG. 2 may, for example, be implemented in step 104 of FIG. 1. Steps 202 and 204 may be included in an object detecting and tracking procedure.

In step 202, the processor may detect the target object from a plurality of consecutive image frames in the video data. In an embodiment, the object detection procedure may be performed by using a hybrid variable window object detection algorithm implemented by an image pyramid algorithm in combination with a classifier pyramid algorithm. The above hybrid algorithm will be described with reference to FIG. 3. However, the present invention is not limited thereto. Step 202 can also be implemented by any known object detection algorithm, such as Haar-like algorithm and Adaboost algorithm. By using the object detection algorithms, classifiers for identifying the target objects can be created.

In step 204, the processor tracks the detected target object. In an embodiment, a histogram of oriented gradient (HOG) feature based kernelized correlation filter (KCF) object tracking procedure may be used to track the target objects.

For example, the processor may convert the target object image into a grayscale image so as to retrieve the HOG features of the target object, and perform a frequency domain transform on the HOG features to obtain HOG frequency domain features. The processor may execute a KCF object tracking procedure to track the HOG frequency domain features so as to track the target object. The frequency domain transform may be, for example, a Fourier transform, which can be expressed as follows:

$$F(x, y) = \sum_{i=0}^{N-1}\sum_{j=0}^{M-1} \beta(i,j) e^{-i2\pi(\frac{xi}{N}+\frac{yi}{N})} \quad \text{(Equation 1)}$$

In Equation 1, β represents the bin component stored in each HOG cell; and x and y represent the block coordinates for calculating the Fourier transform region.

In addition to the above, step 204 may also be implemented by any known object tracking algorithm, such as detect window algorithm and correlation filter algorithm.

In step 206, the processor may determine whether an image frame meets a first selection condition. If yes, in step 208, the processor picks the image frame that meets the first selection condition as a candidate key image frame. If not, the processor determines for the next image frame. The first selection condition may include, for example, selecting an image frame as one of the candidate key image frames if a target object starts to appear or disappear in the image frame. The term "appearing" or "disappearing" of an object refers to the situation where a change of the structural feature of the object exceeds a predetermined threshold. For example, if a pedestrian image in the video data turns from the front to the back, the processor may indicate that the object corresponding to the front of the person disappears and the object corresponding to the back of the person appears.

Figure 3:
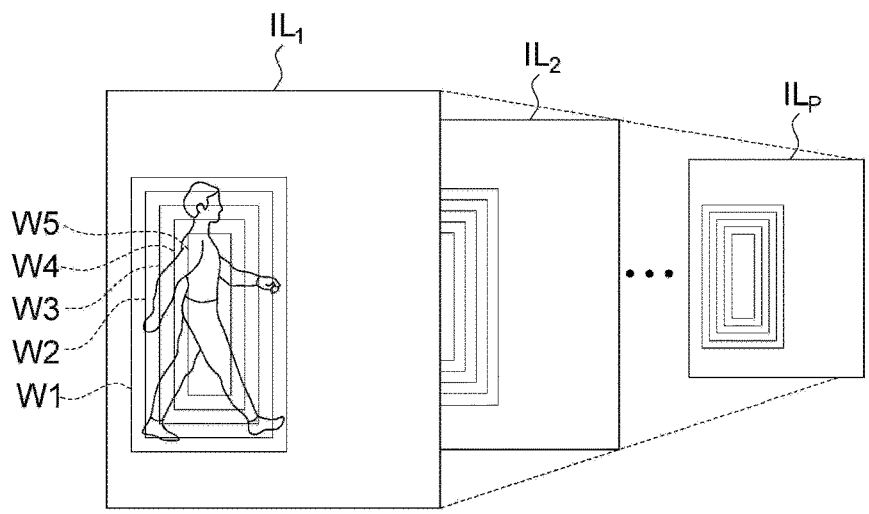
FIG. 3 is a schematic diagram illustrating variable window object detection.

FIG. 3 is a schematic diagram illustrating variable window object detection. According to this example, the processor may create a corresponding image pyramid for each image frame separately. Each image pyramid may include a plurality of image layers with different resolutions. As shown in FIG. 3, the image pyramid includes P image layers $IL_1$ to $IL_P$ with a resolution from high to low, where P is a positive integer greater than one. Each image layer $IL_1$ to $IL_P$ has a corresponding classifier pyramid for executing object detection. In the example of FIG. 3, each of the classifier pyramids includes five detection windows W1 to W5 that are different in size. The processor may detect the target object by searching from the image frame for an object image matching a reference object structure and having a size conforming to a detection window. Although the classifier pyramid in this example is implemented by including five different size detection windows W1 to W5, the disclosure is not limited thereto. The number of detection windows in the classifier pyramid may be arbitrary.

Figure 4:
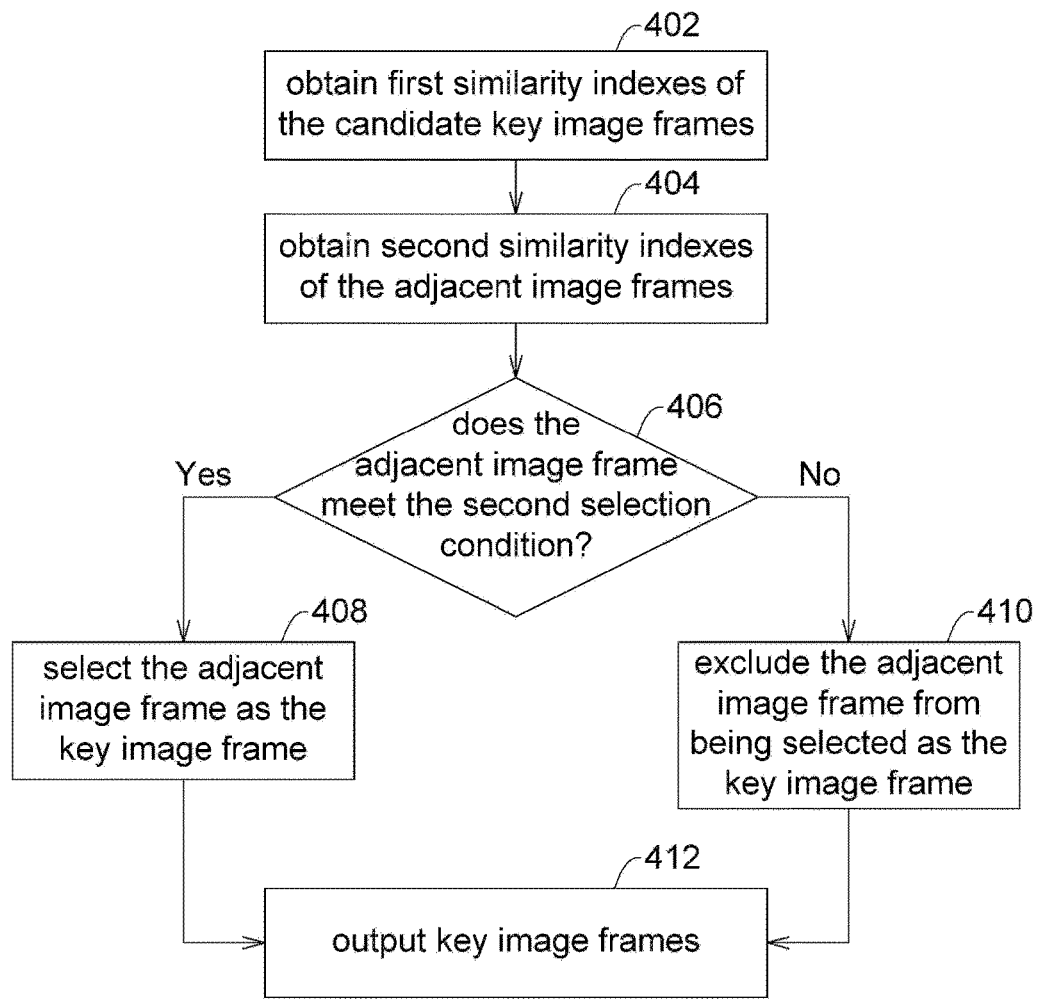
FIG. 4 is a flow chart illustrating an example of selecting the key image frames from the image frames adjacent to the candidate key image frames.

FIG. 4 is a flow chart illustrating an example of selecting the key image frames from the image frames adjacent to the candidate key image frames. In a non-limiting example, the flow of FIG. 4 may, for example, be implemented in step 106 of FIG. 1.

In step 402, the processor may calculate first similarity indexes of the candidate key image frames. For example, the first similarity index may be determined by the processor through a similarity calculation according to a first covariance value ($\sigma_{1xy}$) of the corresponding candidate key image frame and a plurality of first variation values ($\sigma_{1x}$, $\sigma_{1y}$) statistically calculated in different directions (e.g., x and y directions) of the corresponding candidate key image frame. In an embodiment, the first similarity index ($S_1(x, y)$) may be expressed as follows:

$$S_1(x, y) = \frac{\sigma_{1xy} + C}{\sigma_{1x}\sigma_{1y} + C} \quad \text{(Equation 2)}$$

where $$\sigma_{1xy} = \frac{1}{N_p - 1}\sum_{i=1}^{N_p}\sum_{j=1}^{N_x}\sum_{k=1}^{N_y}(\overline{x_j} - \mu_i)(\overline{y_k} - \mu_i);$$

$$C = \frac{KL^2}{2}; K = 10^{-6}; L \in (0, 255].$$

$N_p$ represents the total number of patches that an image frame divided into, $N_x$ represents the total number of block columns along the x direction in a patch, $N_y$ represents the total number of block rows along the y direction in the patch, $\mu_i$ represents the pixel average of the $i^{th}$ block in the patch, $\overline{x}_j$ represents the pixel average of the $j^{th}$ block column in the x direction, and $\overline{y}_k$ represents the pixel average of the $k^{th}$ block row in the y direction.

In step 404, the processor obtains second similarity indexes of the adjacent image frames (where each of the adjacent image frames is adjacent to at least one of the candidate key image frames). The second similarity index may be, for example, determined by the processor through the similarity calculation according to a second covariance value ($\sigma_{2xy}$) of the corresponding adjacent image frame and a plurality of second variation values ($\sigma_{2x}$, $\sigma_{2y}$) statistically calculated in different directions (e.g., x and y directions) of the corresponding adjacent image frame. In an embodiment, the second similarity index ($S_2(x, y)$) may be expressed as follows:

$$S_2(x, y) = \frac{\sigma_{2xy} + C}{\sigma_{2x}\sigma_{2y} + C} \quad \text{(Equation 3)}$$

where $$\sigma_{2xy} = \frac{1}{N_p - 1} \sum_{i=1}^{N_p} \sum_{j=1}^{N_x} \sum_{k=1}^{N_y} (\overline{x_j} - \mu_i)(\overline{y_k} - \mu_i);$$

$$C = \frac{KL^2}{2}; K = 10^{-6}; L \in (0, 255].$$

The similarity calculation used in steps 402 and 404 may also be implemented by other algorithms that is capable of measuring the degree of similarity between objects, such as Euclidean distance algorithm, cosine similarity algorithm, Pearson correlation algorithm and inverse user frequency (IUF) similarity algorithm.

In step 406, the processor determines whether the adjacent image frame meets the second selection condition. The second selection condition may include, for example, when a difference between a corresponding second similarity index ($S_2(x, y)$) of an adjacent image frame and a corresponding first similarity index ($S_1(x, y)$) of a candidate key image frame adjacent to the adjacent image frame exceeds a similarity threshold (i.e., there is a large difference in the object structure between the two image frames), the adjacent image frame is selected as one of the key image frames.

In step 408, the processor selects the adjacent image frames of the candidate key image frames that meet the second selection condition as the key image frames.

Conversely, in step 410, an adjacent image that does not meet the second selection condition is not selected as the key image frame.

Thereafter, in step 412, the processor outputs all the candidate key image frames as well as the adjacent image frames which meet the second selection condition as the key image frames.

Figure 5:
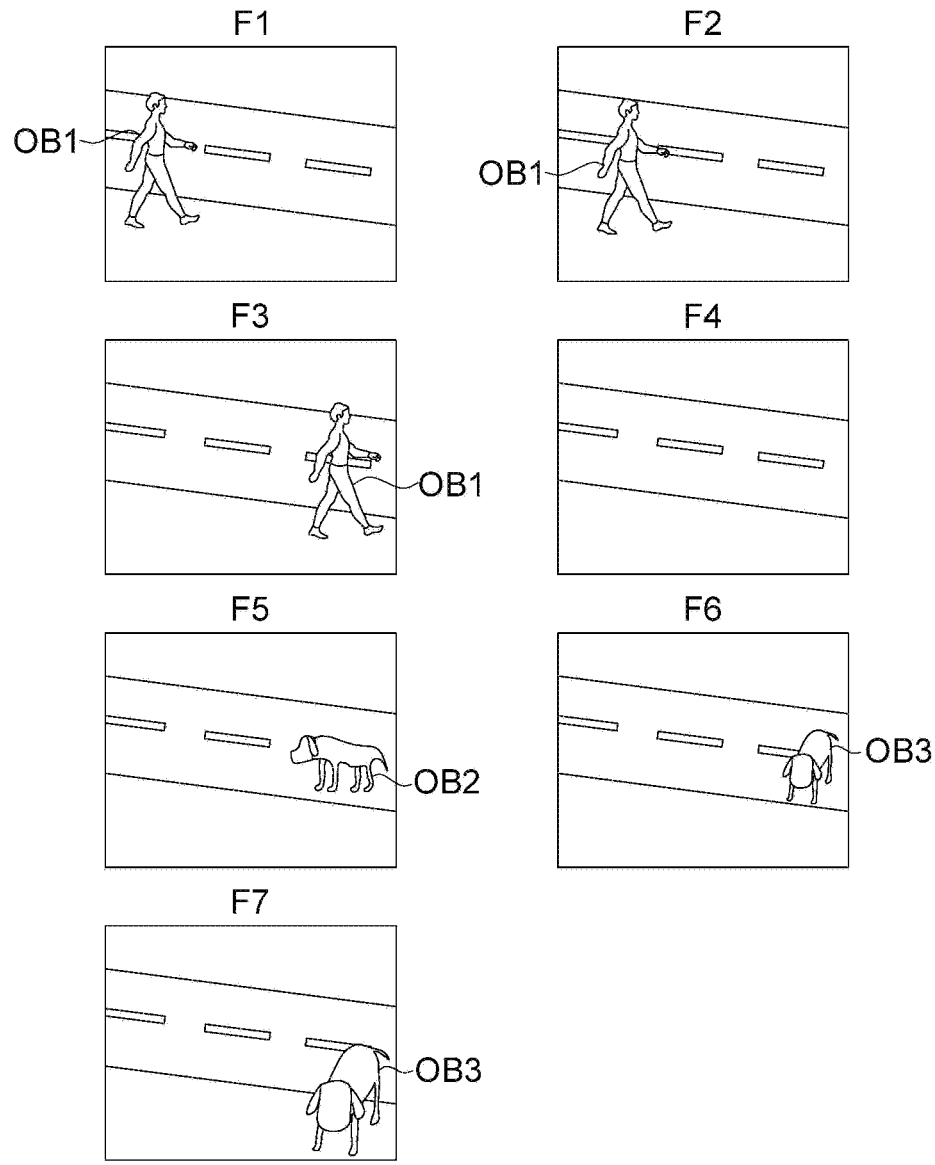
FIG. 5 is a schematic diagram illustrating selecting key image frames from a set of consecutive image frames.

FIG. 5 is a schematic diagram illustrating selecting key image frames from a set of consecutive image frames. In the example of FIG. 5, the image frames F1 to F7 are seven consecutive image frames in the video data. The pedestrian image is regarded as a target object OB1 appearing in the image frames F1 to F3 and disappearing in the image frame F4. The sideways image of the dog is regarded as a target object OB2 appearing in the image frame F5. The frontal image of the dog is considered as the target object OB3 appearing in the image frames F6 to F7. Since the target object (target object OB1/OB2/OB3) starts to appear in the image frames F1, F5 and F6 and the target object (OB1) begins to disappear in the image frame F4, the image frames F1 and F4 to F6 are selected as candidate key image frames.

Next, a determination is made on the adjacent image frames F2, F3, F7 of the candidate key image frames F1 and F4 to F6. Since the adjacent image frames F2 and F7 are similar to the adjacent candidate key image frames F1 and F6, respectively, the adjacent image frames F2 and F7 are excluded from being selected as the key image frames. Since the adjacent image frame F3 and the adjacent candidate key image frame F4 are quite different, the adjacent image frame F3 is selected as one of the key image frames.

Finally, the outputted key image frames may include the image frames F1 and F3 to F6. The key image frames may, for example, be sorted into a sequence and displayed in a GUI.

Figure 6:
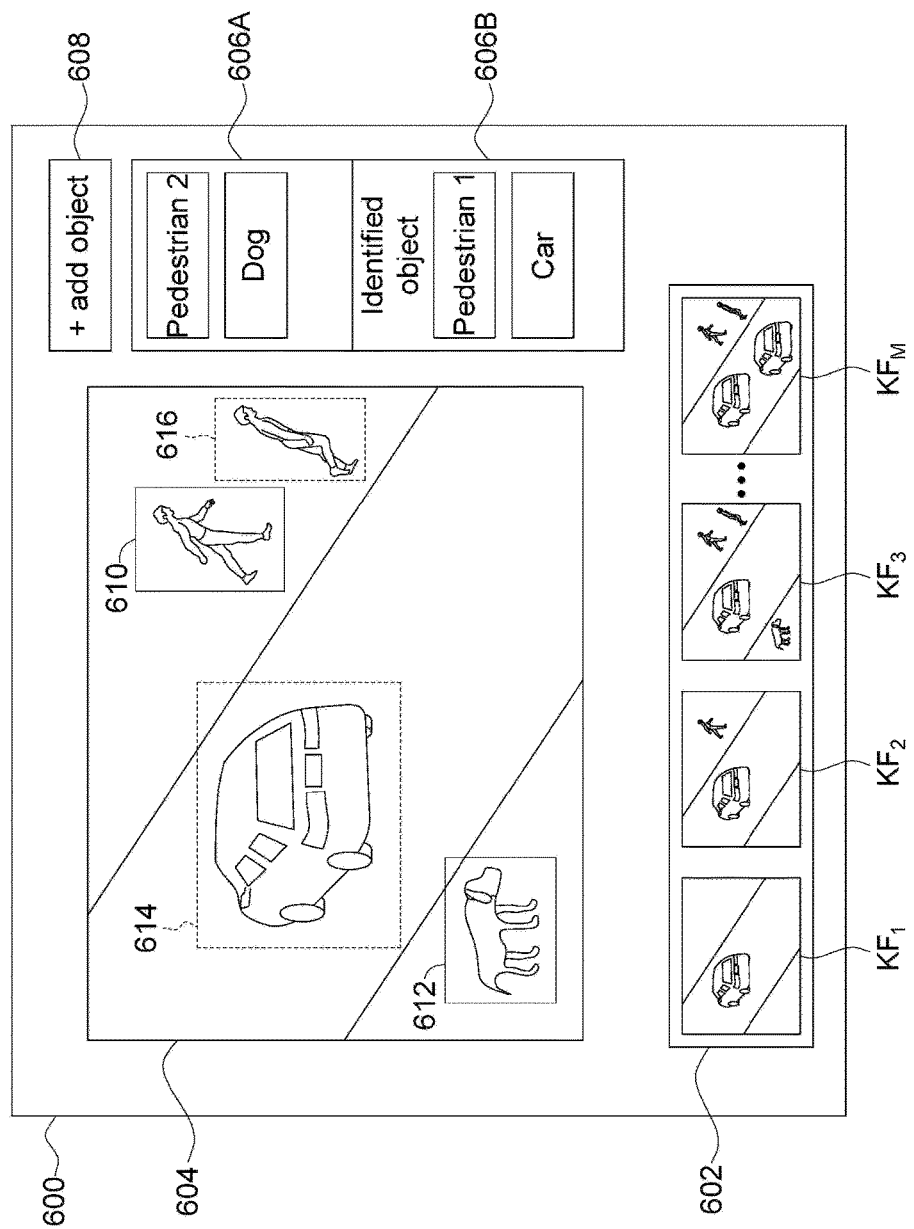
FIG. 6 is a schematic diagram of a GUI 600 according to an embodiment of the present invention.

FIG. 6 is a schematic diagram of a GUI 600 according to an embodiment of the present invention. In the example of FIG. 6, the GUI 600 includes a key image frame display area 602, a main operation area 604, and annotation areas 606A and 606B.

The key image frame display area 602 may display a sequence of M key image frames $KF_1$ to $KF_M$, where M is a positive integer. The user may click on any of the key image frames in the key image frame display area 602, and the selected key image frame may be displayed in the main operation area 604.

The user may select an unidentified object in the main operation area 604. Taking FIG. 6 as an example, the key image frame $KF_3$ is selected, wherein the objects 614 and 616 are identified target objects, and the objects 610 and 612 are user-selected objects that are unidentified and marked by the user manually.

The user may annotate the user-selected object by assigning it a corresponding name or semantic description. The related annotation information may, for example, be displayed on the annotation area 606A. As shown in FIG. 6, the annotation area 606A may show that the user-selected object 610 is annotated as "Pedestrian 2" and the user-selected object 612 is annotated as "Dog."

The annotation information of the identified target objects may be displayed in the annotation area 606B. As shown in FIG. 6, the annotation area 606B may show that the target object 614 is annotated as "Car," and the target object 616 is annotated as "Pedestrian 1".

The GUI 600 may further include one or more operation keys 608. For example, after the operation key 608 ("+add object") is clicked, the user is allowed to select a user-selected object from the content of the key image frame displayed in the main operation area 604 and add the corresponding annotation for the user-selected object. The operation key 608 may also be implemented as a drop-down menu. The menu may, for example, include a preset annotation description and/or an annotation description that has been used.

It should be noted that the example in FIG. 6 is only for illustrating an embodiment of the present invention, but not for limiting the present invention. The GUI of the present invention may also be configured by other text and/or graphics as long as the GUI allows the user to define the user-selected objects from the key image frames and input the corresponding annotation information.

FIG. 7 is a non-limiting detailed flowchart of step 114 in FIG. 1. In order to allow the subsequent image annotation process to adaptively identify and track the newly added user-selected object, the processor may perform a feature enhancement procedure on the user-selected object in step 702, and utilize the enhanced features as training samples to train the classifiers in step 704. The classifiers may have functions of distinguishing corresponding classes and non-corresponding classes, and can be implemented in the object detecting and tracking procedure of step 104 to identify the target objects. The classifiers may be support vector machine (SVM) classifiers or other types of linear mapping classifiers such as Fisher's linear discriminant classifiers and naive Bayes classifiers. The implementation of step 704 can effectively reduce the number of classifiers needed to be added for the newly added user-selected objects, such that the efficiency and accuracy of classification and identification operations can be improved.

Step 702 may be implemented with the object detecting and tracking algorithm used in step 104 of FIG. 1. For example, if the object detecting and tracking procedure is realized based on the HOG features of the image frame, then step 702 may be implemented as an enhancement for the HOG features. Similarly, if the object detecting and tracking procedure used in step 104 of FIG. 1 is realized based on other types of specific image features, then step 702 may be implemented as an enhancement for the specific image features.

Taking the enhanced HOG features as an example, the processor may execute a feature enhancement procedure as follows. The user-selected object is divided into a plurality of blocks. A to-be-processed block is selected from the blocks. A HOG feature extraction procedure is executed, so that a plurality of first HOG features of the to-be-processed block and a plurality of second HOG features of a plurality of adjacent blocks adjacent to the to-be-processed block are obtained. A norm operation on is performed on a feature set including the first HOG features and the second HOG features to obtain a normalization parameter. The first HOG features are normalized according to the normalization parameter, so that a plurality of enhanced first HOG features for executing object detection in the object detecting and tracking procedure are obtained.

The HOG feature extraction procedure includes, for example:

(1) Calculate the edge strength (MO of each pixel position in the block:

$$M_i = \sqrt{(x_{-1}-x_1)^2 + (y_{-1}-y_1)^2}$$ (Equation 4)

In Equation 4, $x_1$ and $x_{-1}$ represent pixel grayscale values in front and back of the target pixel position in the x direction, respectively, and $y_1$ and $y_{-1}$ represent pixel grayscale values above and below the target pixel position in the y direction, respectively.

(2) Calculate the sum of all the edge strengths in the block ($M_{sum}$):

$$M_{sum} = \sum_{i=0}^{n} M_i$$ (Equation 5)

In Equation 5, n represents the total number of pixels in the block.

(3) Calculate the direction component ($B_i$) stored in each bin:

$$B_i = \frac{M_b}{M_{sum}}$$ (Equation 6)

In Equation 6, $M_b$ represents the number of edge strengths classified in a bin.

In addition, when normalizing a to-be-processed block, the features of blocks adjacent to the to-be-processed block are taken into consideration to determine which vectors/edges are the primary or continuous. Then, the normalization is executed for the prominent or important edge vectors.

In an embodiment, the normalization parameter may be expressed as follows:

$$|x| = \sqrt{x_1^2 + \ldots + x_n^2}$$ (Equation 7)

In Equation 7, $x_1$ to $x_n$ represent the HOG features that need to be normalized. For example, the HOG features include all of the first HOG features and the second HOG features. Next, the HOG feature normalization result ($\overline{H}_{(x,y)}$) of the to-be-processed block may be calculated as follows:

$$\overline{H}_{(x,y)} = \frac{1}{|x| + 10^{-3}} H_{(x,y)}$$ (Equation 8)

where $H_{(x,y)}$ represents a pre-normalization result of the HOG features of the to-be-processed block.

In an embodiment, the processor may omit step 702 and train the classifier directly using the features of the user-selected object as training samples.

In the manner described above, the primary edge direction features of consecutive blocks can be enhanced. In an embodiment, the processor may arrange and store the calculated feature values according to the order of accessing the features when the object is detected/tracked, so as to accurately obtain the features of the user-selected object.

FIG. 8 is a schematic diagram of enhanced HOG features. In the example of FIG. 8, 3×3 blocks 802 are shown, with each block 802 including 2×2 cells 804. Each cell may include, for example, a plurality of pixels (not shown). Before the normalization, for different blocks 802, the HOG feature sets corresponding to different directions such as VA1 and VA2 may be obtained. After the normalization, the HOG feature sets VA1 and VA2 may be respectively converted into the enhanced HOG feature sets VA1 'and VA2'. It can be seen that some HOG features in the enhanced HOG feature sets VA1' and VA2' are enhanced compared to the HOG feature sets VA1 and VA2.

Figure 9:
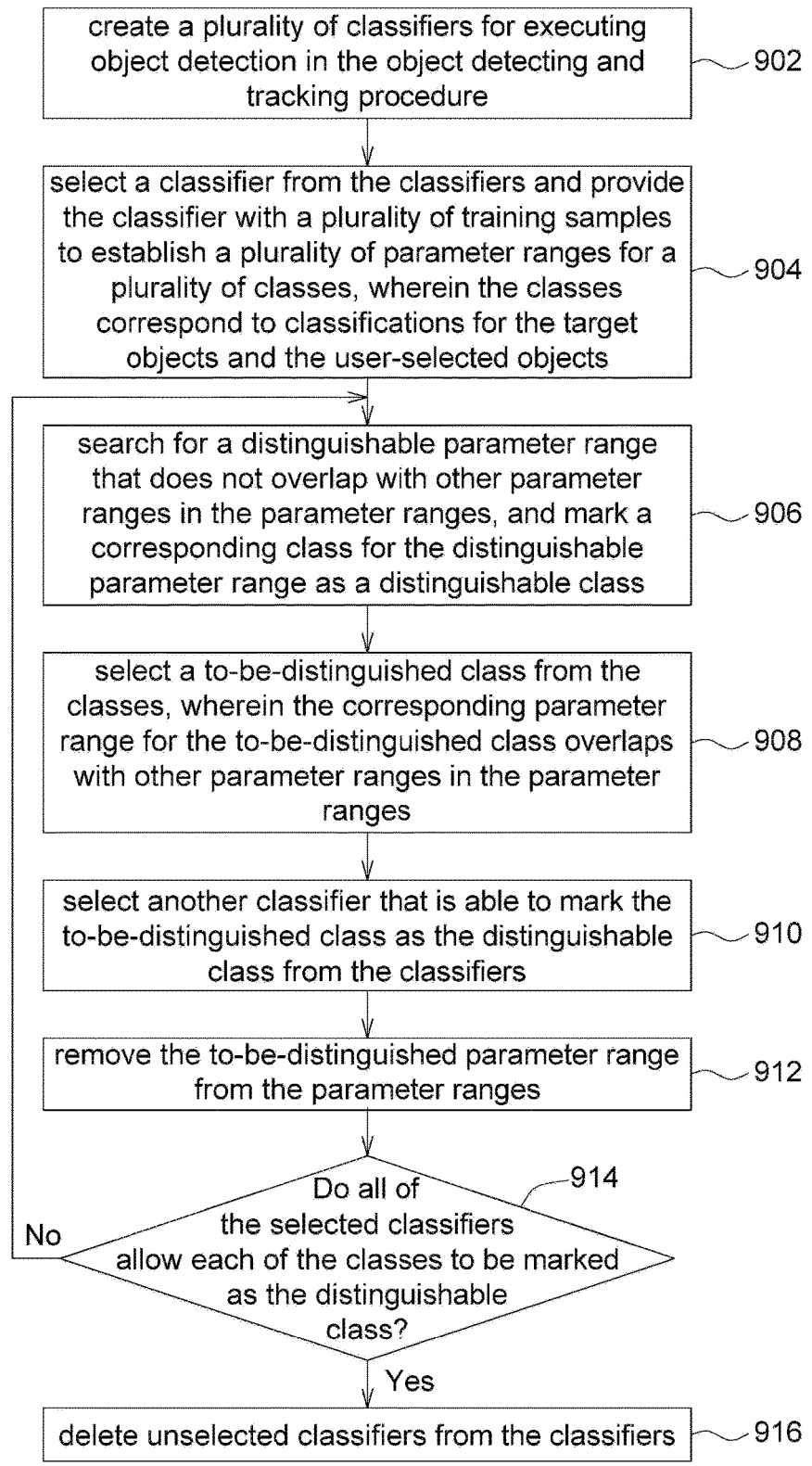
FIG. 9 is a flow chart illustrating the adaptive training of a multi-class classifier according to an embodiment of the present invention.

FIG. 9 is a flow chart illustrating the adaptive training of a multi-class classifier according to an embodiment of the present invention. In step 902, the processor creates a plurality of classifiers for executing object detection in the object detecting and tracking procedure.

In step 904, the processor selects a classifier from the classifiers and provides the classifier with a plurality of training samples to establish a plurality of parameter ranges for a plurality of classes, wherein the classes correspond to classifications for the target objects and the user-selected objects.

In step 906, the processor searches in the parameter ranges for a distinguishable parameter range that does not overlap with other parameter ranges, and marks the corresponding class for the distinguishable parameter range as a distinguishable class.

In step 908, the processor selects a to-be-distinguished class from the classes, wherein the corresponding parameter range for the to-be-distinguished class overlaps with other parameter ranges in the parameter ranges. In an embodiment, the corresponding parameter range for the to-bedistinguished class overlaps with the most number of other parameter ranges in the parameter ranges.

In step 910, the processor selects another classifier that is able to mark the to-be-distinguished class as the distinguishable class from the classifiers.

In step 912, the processor removes the to-be-distinguished parameter range from the parameter ranges.

In step 914, the processor determines whether all of the selected classifiers in the classifiers allow each of the classes to be marked as a distinguishable class. If yes, the flow continues to step 916 to delete the unselected classifiers from the classifiers. If not, the flow goes back to step 906 to continues to execute the adaptive training process until all the selected classifiers can make each class to be marked as the distinguishable class.

In an embodiment, the processor may provide a plurality of particular training samples for a particular class to a classifier to obtain a plurality of distance values, and determine a particular parameter range for the particular class according to an average value of the distance values and a standard deviation of the distance values. Below, the details are described in conjunction with FIG. 10 and FIG. 11.

In addition, according to the following embodiments, the training samples for an untrained object class (e.g., an object class corresponding to the user-selected object) are used as positive samples for the classifiers, and the training samples for other object classes are used as negative samples for the classifiers.

Figure 10:
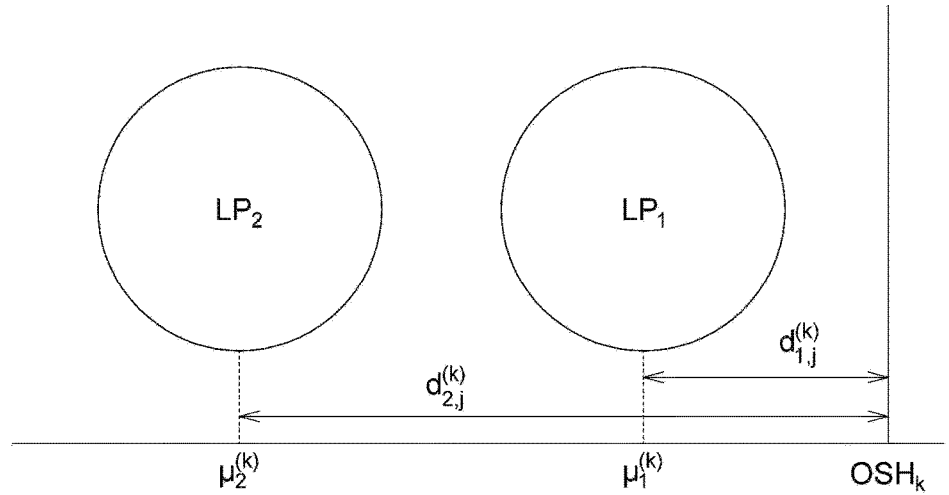
FIG. 10 is a schematic diagram illustrating the distance values of training samples in different classes for the classifiers.

FIG. 10 is a schematic diagram illustrating the distance values of training samples in different classes for the classifiers. According to the embodiment, the processor may input training samples to each classifier to obtain corresponding distance values. For example, the corresponding distance value obtained by inputting the $j^{th}$ training sample for the $i^{th}$ class to the $k^{th}$ SVM classifier may be expressed as follows:

$$d_{i,j}^{(k)} = -\rho_k + \overline{S_{i,j}} \cdot \overline{D_k} \quad \text{(Equation 9)}$$

where $\overline{D_k}$ represents the feature vector size; $\overline{S_{i,j}}$ represents a feature vector extracted from the $j^{th}$ training sample for the $i^{th}$ class; $\rho_k$ represents the rho parameter of the $k^{th}$ SVM classifier. The processor may then calculate the average value of the distance values as follows:

$$\mu_i^{(k)} = \frac{1}{st_i} \sum_{j=1}^{st_i} d_{i,j}^{(k)} \quad \text{(Equation 10)}$$

where $st_i$ represents the number of training samples for the $i^{th}$ class.

With the above manner, different classes can be projected onto a one-dimensional space, wherein $OSH_k$ represents the distance value reference point for the $k^{th}$ SVM classifier.

Figure 11:
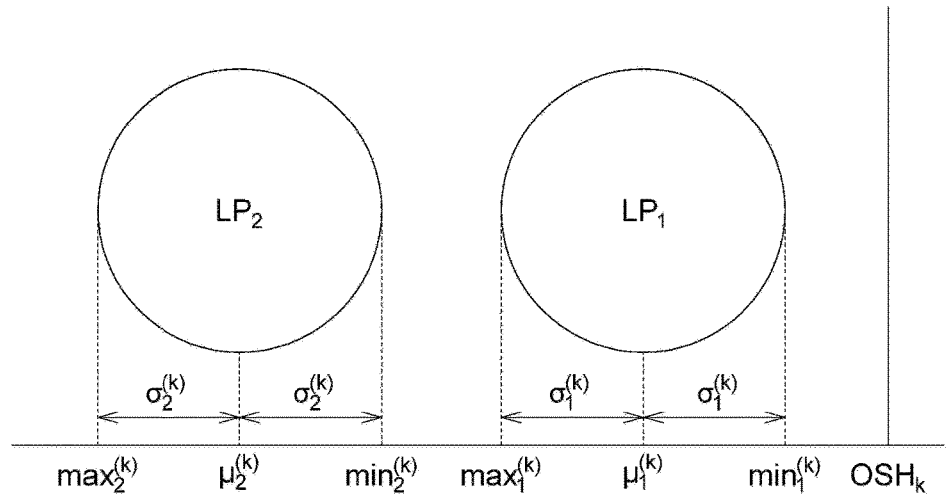
FIG. 11 is a schematic diagram illustrating parameter ranges for different classes of a classifier.

FIG. 11 is a schematic diagram illustrating parameter ranges for different classes of a classifier. As shown in FIG. 11, different classes $LP_1$ and $LP_2$ respectively correspond to an one-dimensional parameter range ($min_1^{(k)} \sim max_1^{(k)}$ and $min_2^{(k)} \sim max_2^{(k)}$), wherein the center value of each parameter range is the average value of the corresponding distance values ($\mu_1^{(k)}$ and $\mu_2^{(k)}$), and the upper limit and the lower limit of the parameter range are respectively separated by one standard deviation from the average value. The standard deviation can be expressed as follows, for example:

$$\sigma_i^{(k)} = \sqrt{\frac{1}{st_i} \sum_{i=1}^{st_i} (d_{i,j}^{(k)} - \mu_i^{(k)})^2} \quad \text{(Equation 11)}$$

Based on the corresponding distance average values ($\mu_1^{(k)}$ and an$\mu_2^{(k)}$) and the standard deviations ($v_1^{(k)}$ and $v_2^{(k)}$) of the respective classes $LP_1$ and $LP_2$, the upper limit of each parameter range can be expressed as follows for example:

$$max_i^{(k)} = \mu_i^{(k)} + \sigma_i^{(k)} \quad \text{(Equation 12)}$$

The lower limit of each parameter range may be expressed as follows for example:

$$min_i^{(k)} = \mu_i^{(k)} - \sigma_i^{(k)} \quad \text{(Equation 13)}$$

Although in the above example the upper limit and the lower limit of the parameter range are respectively separated by one standard deviation from the average value, the present invention is not limited thereto. The size of parameter range can be adjusted depending on applications.

Figure 12:
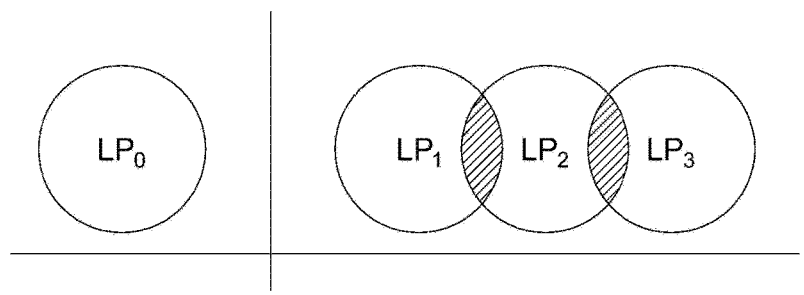
FIG. 12 is a schematic diagram illustrating the adaptive training of a multi-class classifier.
Figure 12:
Figure 12:
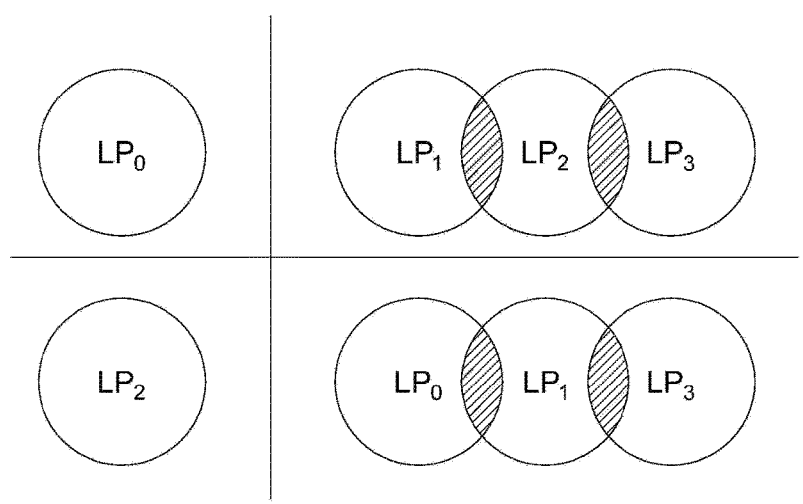
Figure 12:
Figure 12:
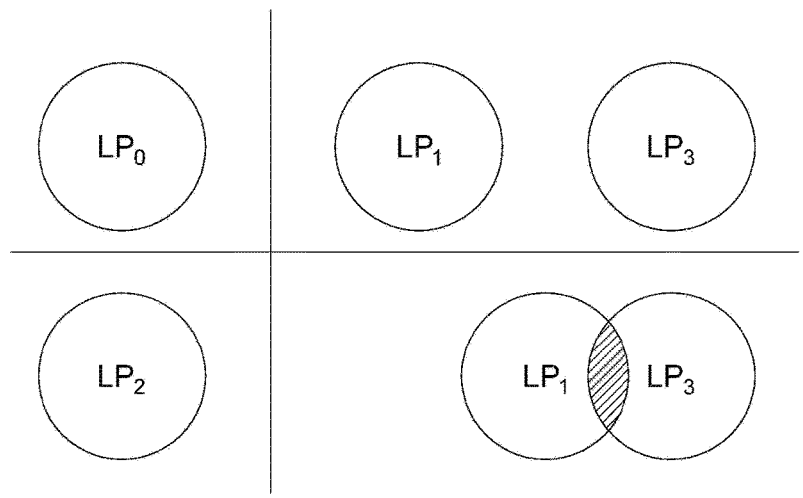

FIG. 12 is a schematic diagram illustrating the adaptive training of a multi-class classifier. In the example of FIG. 12, all the classes to be distinguished include $LP_0$, $LP_1$, $LP_2$, and $LP_3$. In stage 1202, the first SVM classifier is used to distinguish the class $LP_0$ and the non-$LP_0$ classes. In other words, the parameter range for the distinguishable class $LP_0$ does not overlap with the parameter ranges for other classes. However, the first SVM classifier fails to distinguish the parameter ranges for the remaining classes $LP_1$, $LP_2$ and $LP_3$ due to overlapping. In stage 1204, a second SVM classifier is introduced to distinguish the class $LP_2$ of which the parameter range overlaps with the most number of other parameter ranges. In stage 1206, the parameter ranges used by the trained first classifier and the second classifier are deleted. In this way, the parameter ranges corresponding to all the classes $LP_0$ to $LP_3$ are separated. In other words, with the above manner, the classification of four classes can be done by only two classifiers. Compared with the conventional method that a corresponding classifier needs to be set for each category, the proposed multi-class classifier adaptive training method is capable of reducing the use of classifiers and improving the operation efficiency.

Based on the above, the present invention provides an image annotation method, an electronic device and a non-transitory computer-readable storage medium, which can automatically filter out highly repetitive invalid image frame samples in the video data, extract key image frames with object structure diversity, and provide the key image frames to the user for browsing, so that the annotation items can be added and/or modified by the user, thereby improving the annotation result and saving labor required for image annotation. On the other hand, the technique proposed in the present invention also involves expert experience feedback mechanism to enhance the accuracy and robustness for extracting the key image frames.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image annotation method implemented by an electronic device including a processor, comprising:
   acquiring a sequence of image frames comprising a plurality of image frames from video data by the processor;

performing an object detecting and tracking procedure on the sequence of image frames by the processor, so as to identify and track one or more target objects from the image frames;

selecting a plurality of candidate key image frames from the image frames according to a first selection condition by the processor, wherein the first selection condition comprises when a target object in the one or more target objects starts to appear or disappears in an image frame of the image frames, selecting the image frame as one of the candidate key image frames;

determining a plurality of first similarity indexes of the candidate key image frames by the processor, wherein each of the first similarity indexes is determined by the processor through a similarity calculation according to a first covariance value of a corresponding one of the candidate key image frames and a plurality of first variation values statistically calculated in different directions of the corresponding candidate key image frame;

determining a plurality of second similarity indexes of a plurality of adjacent image frames by the processor, wherein each of the adjacent image frames is adjacent to at least one of the candidate key image frames, and each of the second similarity indexes is determined by the processor through the similarity calculation according to a second covariance value of a corresponding one of the adjacent image frames and a plurality of second variation values statistically calculated in different directions of the corresponding adjacent image frame;

selecting the candidate key image frames as well as the adjacent image frames that meet a second selection condition as a plurality of key image frames, wherein the second selection condition comprises when a difference between a corresponding second similarity index of an adjacent image frame of the adjacent image frames and a corresponding first similarity index of a candidate key image frame adjacent to the adjacent image frame exceeds a similarity threshold, selecting the adjacent image frame as one of the key image frames; and presenting the key image frames on a graphical user interface and displaying annotation information for the one or more target objects through the graphical user interface by the processor.

2. The image annotation method according to claim 1, wherein the object detecting and tracking procedure comprises:

creating a plurality of image pyramids for the image frames by the processor, each of the image pyramids comprising a plurality of image layers with different resolutions; and performing object detection with a plurality of classifier pyramids in each of the image pyramids by the processor.

3. The image annotation method according to claim 2, wherein the object detecting and tracking procedure comprises:

extracting a histogram of oriented gradient (HOG) feature of the one or more target objects by the processor;

performing a frequency domain transform on the HOG feature to obtain a HOG frequency domain feature by the processor; and executing a kernelized correlation filter (KCF) object tracking procedure to track the HOG frequency domain feature by the processor.

4. The image annotation method according to claim 1, further comprising:

receiving, by the processor, a user operation via the graphical user interface; and generating, by the processor, an annotation result in response to the user operation, wherein the annotation result comprises a user-selected object and annotation information about the user-selected object, the user-selected object is extracted from image contents of the key image frames.

5. The image annotation method according to claim 4, further comprising:

executing a feature enhancement procedure by the processor, the feature enhancement procedure comprising:
dividing the user-selected object into a plurality of blocks;
selecting a to-be-processed block from the blocks;
executing a HOG feature extraction procedure to obtain a plurality of first HOG features of the to-be-processed block and a plurality of second HOG features of a plurality of adjacent blocks adjacent to the to-be-processed block;
performing a norm operation on a feature set including the first HOG features and the second HOG features to obtain a normalization parameter; and
normalizing the first HOG features according to the normalization parameter to obtain a plurality of enhanced first HOG features for executing object detection in the object detecting and tracking procedure.

6. The image annotation method according to claim 4, further comprising:

(a) creating a plurality of classifiers for executing object detection in the object detecting and tracking procedure by the processor;

(b) selecting a classifier from the classifiers and providing the classifier with a plurality of training samples to establish a plurality of parameter ranges for a plurality of classes by the processor, wherein the classes correspond to classifications for the one or more target objects and the user-selected object;

(c) searching for a distinguishable parameter range that does not overlap with other parameter ranges in the parameter ranges, and marking a corresponding class for the distinguishable parameter range as a distinguishable class by the processor;

(d) selecting a to-be-distinguished class from the classes by the processor, wherein a corresponding parameter range for the to-be-distinguished class overlaps with other parameter ranges in the parameter ranges;

(e) selecting another classifier that is able to mark the to-be-distinguished class as the distinguishable class from the classifiers by the processor;

(f) removing the to-be-distinguished parameter range from the parameter ranges;

(g) repeating steps (c) to (f) by the processor until all of the selected classifiers in the classifiers allow each of the classes to be marked as the distinguishable class; and (h) deleting an unselected classifier from the classifiers.

7. The image annotation method according to claim 6, wherein the corresponding parameter range for the to-be-distinguished class overlaps with the most number of other parameter ranges in the parameter ranges.

8. The image annotation method according to claim 6, further comprising:

providing a plurality of particular training samples corresponding to a particular class of the classes in the training samples to the classifier to obtain a plurality of distance values by the processor; and determining a particular parameter range for the particular class in the parameter ranges according to an average value of the distance values and a standard deviation of the distance values.

9. The image annotation method according to claim 8, wherein a center value of the particular parameter range is the average value, an upper limit value and a lower limit value of the particular parameter range are respectively separated by the standard deviation from the average value.

10. The image annotation method according to claim 4, wherein the classifiers are support vector machine (SVM) classifiers.

11. A non-transitory computer-readable storage medium storing one or more instructions executable by a processor to cause an electronic device comprising the processor perform the image annotation method as described in claim 1.

12. An electronic device, comprising:
a memory; and
a processor coupled to the memory and configured to:
acquire a sequence of image frames comprising a plurality of image frames from video data;
perform an object detecting and tracking procedure on the sequence of image frames, so as to identify and track one or more target objects from the image frames;
select a plurality of candidate key image frames from the image frames according to a first selection condition, wherein the first selection condition comprises when a target object in the one or more target objects starts to appear or disappears in an image frame of the image frames, selecting the image frame as one of the candidate key image frames;
determine a plurality of first similarity indexes of the candidate key image frames, wherein each of the first similarity indexes is determined by the processor through a similarity calculation according to a first covariance value of a corresponding one of the candidate key image frames and a plurality of first variation values statistically calculated in different directions of the corresponding candidate key image frame;
determine a plurality of second similarity indexes of a plurality of adjacent image frames, wherein each of the adjacent image frames is adjacent to at least one of the candidate key image frames, and each of the second similarity indexes is determined by the processor through the similarity calculation according to a second covariance value of a corresponding one of the adjacent image frames and a plurality of second variation values statistically calculated in different directions of the corresponding adjacent image frame;
select the candidate key image frames as well as the adjacent image frames that meet a second selection condition as a plurality of key image frames, wherein the second selection condition comprises when a difference between a corresponding second similarity index of an adjacent image frame of the adjacent image frames and a corresponding first similarity index of a candidate key image frame adjacent to the adjacent image frame exceeds a similarity threshold, selecting the adjacent image frame as one of the key image frames; and present the key image frames on a graphical user interface and display annotation information for the one or more target objects through the graphical user interface.

13. The electronic device according to claim 12, wherein the processor is further configured to:
create a plurality of image pyramids for the image frames, each of the image pyramids comprising a plurality of image layers with different resolutions; and
perform object detection with a plurality of classifier pyramids in each of the image pyramids.

14. The electronic device according to claim 13, wherein the processor is further configured to:
extract a histogram of oriented gradient (HOG) feature of the one or more target objects;
perform a frequency domain transform on the HOG feature to obtain a HOG frequency domain feature; and
execute a kernelized correlation filter (KCF) object tracking procedure to track the HOG frequency domain feature.

15. The electronic device according to claim 12, wherein the processor is further configured to:
receive a user operation via the graphical user interface; and
generate an annotation result in response to the user operation, wherein the annotation result comprises a user-selected object and annotation information about the user-selected object, the user-selected object is captured from image contents of the key image frames.

16. The electronic device according to claim 15, wherein the processor is further configured to:
execute a feature enhancement procedure comprising:
divide the user-selected object into a plurality of blocks;
select to-be-processed block from the blocks;
execute a HOG feature extraction procedure to obtain a plurality of first HOG features of the to-be-processed block and a plurality of second HOG features of a plurality of adjacent blocks adjacent to the to-be-processed block;
perform a norm operation on a feature set including the first HOG features and the second HOG features to obtain a normalization parameter; and
normalize the first HOG features according to the normalization parameter to obtain a plurality of enhanced first HOG features for executing object detection in the object detecting and tracking procedure.

17. The electronic device according to claim 15, wherein the processor is further configured to:
(a) create a plurality of classifiers for executing object detection in the object detecting and tracking procedure;
(b) select a classifier from the classifiers and provide the classifier with a plurality of training samples to establish a plurality of parameter ranges for a plurality of classes, wherein the classes correspond to classifications for the one or more target objects and the user-selected object;
(c) search for a distinguishable parameter range that does not overlap with other parameter ranges in the parameter ranges, and mark a corresponding class for the distinguishable parameter range as a distinguishable class;
(d) select a to-be-distinguished class from the classes, wherein a corresponding parameter range for the to-be-distinguished class overlaps with other parameter ranges in the parameter ranges;

(e) select another classifier that is able to mark the to-be-distinguished class as the distinguishable class from the classifiers;

(f) remove the to-be-distinguished parameter range from the parameter ranges;

(g) repeat steps (c) to (f) until all of the selected classifiers in the classifiers allow each of the classes to be marked as the distinguishable class; and (h) delete an unselected classifier from the classifiers.

18. The electronic device according to claim 17, wherein the corresponding parameter range for the to-be-distinguished class overlaps with the most number of other parameter ranges in the parameter ranges.

19. The electronic device according to claim 17, wherein the processor is further configured to:

provide a plurality of particular training samples corresponding to a particular class of the classes in the training samples to the classifier to obtain a plurality of distance values; and determine a particular parameter range for the particular class in the parameter ranges according to an average value of the distance values and a standard deviation of the distance values.

20. The electronic device according to claim 19, wherein a center value of the particular parameter range is the average value, an upper limit value and a lower limit value of the particular parameter range are respectively separated by the standard deviation from the average value.

* * * * *